United States Patent [19]

Kimura

[11] Patent Number: 5,665,962

[45] Date of Patent: Sep. 9, 1997

[54] IMAGE READER AND IMAGE RECORDER WITH INTERPOSED PHOTOCHROMIC MATERIAL FOR REDUCING FLARE

[75] Inventor: Toshihito Kimura, Kanagawa-ken, Japan

[73] Assignee: Fuji Photo Film Co., Ltd., Kanagawa, Japan

[21] Appl. No.: 404,455

[22] Filed: Mar. 15, 1995

[30] Foreign Application Priority Data

Apr. 19, 1994 [JP] Japan .................................. 6-080293

[51] Int. Cl.⁶ .............................. G03B 42/02; H04N 1/04
[52] U.S. Cl. ........................ 250/226; 250/236; 250/585; 250/484.4
[58] Field of Search ........................ 250/216, 234, 250/235, 236, 226, 559.02, 559.06, 586, 587, 588, 591, 585, 584, 583, 582, 581, 580, 488.1, 487.1, 485.1, 484.4, 483.1; 359/241, 243, 244, 240, 614

[56] References Cited

U.S. PATENT DOCUMENTS

| | | | |
|---|---|---|---|
| 3,801,825 | 4/1974 | Schwartz et al. | 250/216 |
| 3,887,271 | 6/1975 | Yamaguchi et al. | 250/458.1 |
| 4,258,264 | 3/1981 | Kotera et al. | 250/484 |
| 4,577,098 | 3/1986 | Ogawa | 250/216 |
| 4,582,988 | 4/1986 | Aagano | 250/327.2 |
| 4,629,890 | 12/1986 | Goto et al. | 250/586 |
| 4,800,276 | 1/1989 | Noguchi | 250/586 |
| 5,081,356 | 1/1992 | Horikawa | 250/586 |
| 5,461,238 | 10/1995 | Hara et al. | 250/587 |

FOREIGN PATENT DOCUMENTS 56-11395   2/1981   Japan .
61-120573  6/1986   Japan .

Primary Examiner—Edward P. Westin
Assistant Examiner—John R. Lee
Attorney, Agent, or Firm—Sughrue, Mion, Zinn, Macpeak & Seas

[57] ABSTRACT

An optical scanning image reader and an optical scanning image recorder are disclosed. The image reader is provided with a light source for emitting an optical beam that scans a recording material on which an image is recorded, a photodetector for reading an image by photoelectrically detecting light that has a wavelength differing from that of the optical beam and is emitted from the recording material as a result of the scanning of the recording material, and a photochromic material which increases transmissivity upon exposure to the optical beam but decreasing the transmissivity upon exposure to the emitted light. The photochromic material is positioned in proximity to, or in close contact with, the recording material, and the photodetector is positioned so as to receive the emitted light through the photochromic material. The photochromic material may have a nonlinear characteristic that increases transmissivity upon exposure to the reading optical beam but decreases a property of changing transmissivity in accordance with an optical intensity to a considerably low degree in a low optical intensity region, and the photochromic material is positioned so as to receive the reading optical beam advancing towards the recording material. Flare light advancing towards areas other than a predetermined scanning point on the recording material cannot pass through the photochromic material, and hence the influence of the flare light can be prevented.

13 Claims, 9 Drawing Sheets

F I G. 10
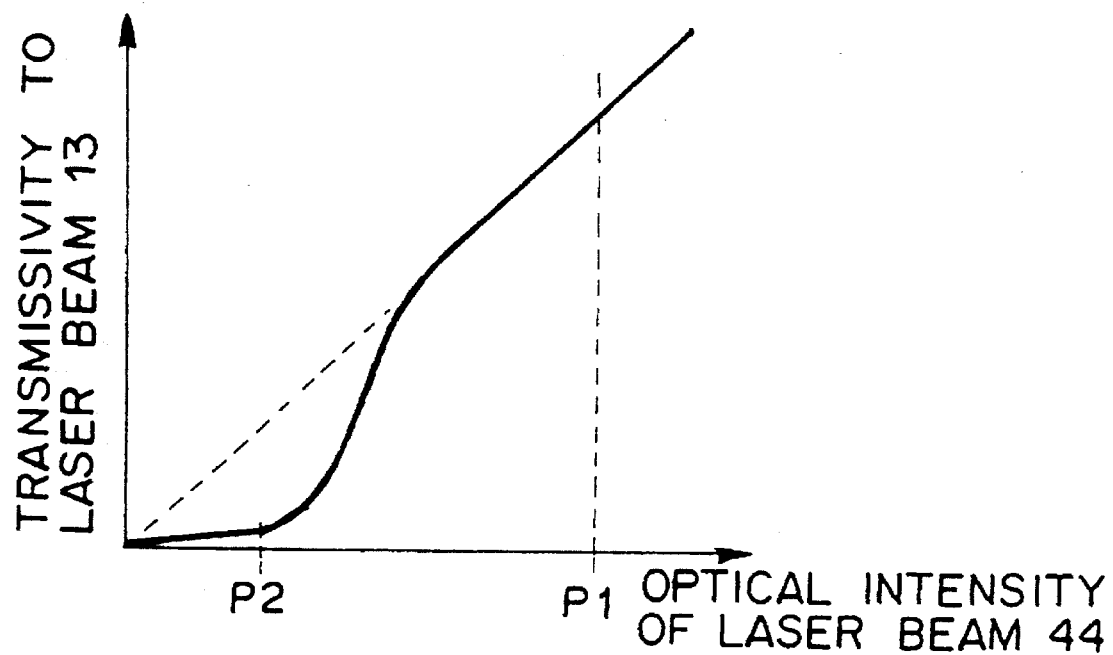
F I G. 11
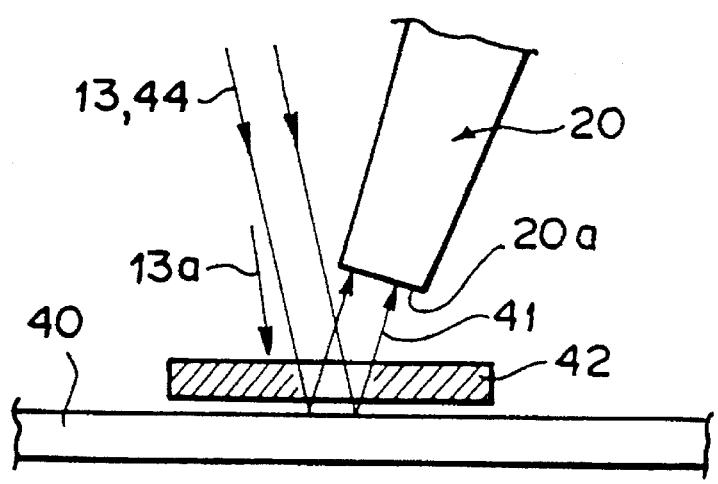

IMAGE READER AND IMAGE RECORDER WITH INTERPOSED PHOTOCHROMIC MATERIAL FOR REDUCING FLARE

BACKGROUND OF THE INVENTION

1. Field of the Invention

This invention relates to an image reader that reads an image recorded on a recording material by scanning it using an optical beam, and an image recorder that records an image on a recording material by scanning it using an optical beam modulated on the basis of an image signal. More particularly, this invention relates to an image reader and an image recorder designed in such a way as to make it possible to reduce the influence of flare developing in a reading optical beam and a recording optical beam.

2. Description of the Prior Art

Various types of image reader are already known, wherein a recording material on which images are recorded is scanned by a reading optical beam, and the recorded images are read by photoelectrically detecting emitted light, transmitted light or reflected light from the recording material as a result of scanning. Various types of image recorder are also known, wherein images carried by image signals are recorded on a recording material by scanning a recording optical beam, modulated on the basis of an image signal, over the recording material such as a photosensitive material.

In the above-mentioned image readers, there is a possibility that a part of the reflected light occurring when a recording optical beam enters a predetermined scanning point on a recording material is further reflected by an optical system and reenters the other areas of the recording material outside the predetermined scanning point. In many cases, either emitted light, transmitted light or reflected light caused by such flare phenomena may be detected in conjunction with emitted light, transmitted light or reflected light arising from the scanning point. If this is the case, a resultantly read image may have poor contrast.

In addition, the reading optical beam causes flare before entering the predetermined scanning point on the recording material, and weak flare light occurring as a result of the flare may enter the recording material together with the optical beam while being positioned in the vicinity of the optical beam. Even in such a case, emitted light, transmitted light or reflected light caused by the flare light will appear from areas other than the predetermined scanning point, and hence a similar problem may be encountered.

Such flare phenomena may also occur even in the case of a recording optical beam used in the previously mentioned image recorder. If this is the case, a recorded image may have poor contrast.

Conventionally, various techniques are put forward to reduce the influence of flare phenomena developing in a scanning optical beam. For example in U.S. Pat. No. 4,582,988, an image reader is disclosed which has a light shielding member, with a slot elongated in the direction of primary scanning, positioned on a recording material for reading purposes. The scanning of a reading optical beam and the detection of emitted light are carried out through this slit. Moreover, for example in Japanese Unexamined Patent Publication No. Sho-61(1986)-120573, an image reader is disclosed which is provided with a liquid crystal shutter that absorbs a reading optical beam reflected from a recording material.

By virtue of these techniques, it is possible to attain a reduced influence of flare. However, the technique disclosed in the former patent publication encounters problems such as the impossibility of reducing flare occurring in the direction of primary scanning, complicated alignment between the primary scanning line and the slit, and the difficulty of sufficiently reducing a slit width because of manufacturing technique restrictions. The technique disclosed in the latter patent publication results in a costly system because of the expensive liquid crystal.

SUMMARY OF THE INVENTION

The present invention is made in view of the above drawbacks in the prior art, and the primary object of this invention is to provide an image-reader and an image recorder that can ensure the reduction of the influence of flare phenomena utilizing a simple construction.

To achieve this end, according to a first aspect of the present invention, there is provided an image reader wherein a recording material on which an image is recorded is scanned by a reading optical beam, and a recorded image is read by photoelectrically detecting light, which is emitted from this recording material and has a wavelength differing from that of the reading optical beam, using a photodetector, the improvement being characterized by comprising material whose transmissivity is increased upon exposure to the reading optical beam but decreased upon exposure to the emitted light, the material being positioned in close proximity to, or in close contact with, the recording material at the position where the material is exposed to the reading optical beam; and the photodetector positioned so as to receive the emitted light via the material.

In the above mentioned image reader, the transmissivity of the material is increased upon exposure to the reading optical beam, whilst it is decreased upon exposure to the light emitted from the recording material. Such material is positioned in proximity to, or in close contact with, the recording material at the location where the recording material is exposed to the reading optical beam. In such an arrangement, the reading optical beam causes the transmissivity of the material to be increased, and hence the beam appropriately passes through the material. Upon arrival of the optical beam at a predetermined scanning point, light is emitted from this scanning point. At this time, the emitted light is irradiated around the area of the material through which the optical beam passes, and the transmissivity of the material remains low.

In such a situation, even if weak flare light arising from the optical beam tries to enter the recording material from the vicinity of the optical beam, the flare light cannot appropriately pass through the area of the material whose transmissivity is low. Hence, emitted light occurring as a result of the arrival of the flare light at the recording material is not brought about. The emitted light arising from the predetermined scanning point passes through the spot-shaped area of the material whose transmissivity has become high upon exposure to the reading optical beam, whereby the optical beam can enter the photodetector.

The reading optical beam that directly advances to the predetermined scanning point on the recording material only arrives at the recording material. Light emitted from the recording material as a result of the arrival of the optical beam at the recording material is solely detected by the photodetector. In this way, the influence of flare is eliminated.

The spot-shaped area of the material whose transmissivity becomes high as a result of exposure to the reading optical beam moves together with the scanning of the reading optical beam. Accordingly, it becomes possible to carry out the scanning of the reading optical beam and the detection of the emitted light as if they are being carried out through a moving pinhole. In this way, the elimination of the influence of the flare light is ensured in both primary and secondary scanning directions.

Some of materials change their transmissivities at a relatively low speed. In such a case, it takes a relatively long time for the spot-shaped area, where the transmissivity of the material is increased upon exposure to the reading optical beam, to resume low transmissivity state after the reading optical beam has left this area. If this happens, the area where the transmissivity of the material is high will not be shaped like a spot but a slit. This may deteriorate the flare reducing effect in the direction of primary scanning.

To prevent such a problem, in one preferred embodiment, the above-mentioned image reader comprises:

a light source for emitting a second optical beam in a wavelength region where the transmissivity of the material is decreased; and a means for scanning the second optical beam over the material in such a way that the optical beam traces the reading optical beam.

The second optical beam in a wavelength range which causes the transmissivity of the material to be decreased is scanned over the material in such a way as to trace the reading optical beam. The spot-shaped area where the transmissivity of the material is increased upon exposure to the reading optical beam is positively restored to a low transmissivity state by the second optical beam after the reading optical beam has left from this area. Thus, the area of the material where the transmissivity is high always assumes a spot shape, and hence the flare reducing effect is ensured even in the primary scanning direction.

To obtain the same results, in another preferred embodiment, the above-mentioned image reader comprises:

a light source for emitting light in a wavelength region where the transmissivity of the material is decreased; and a means for causing the entire material to be exposed in the light for a period of time during which effective primary scanning using the reading optical beam is suspended.

In this embodiment, light in a wavelength range which causes the transmissivity of the material to be reduced is irradiated all over the material for a period during which effective primary scanning using the reading optical beam is suspended. Even if the area of the material where the transmissivity is increased assumes a spot-like shape at the time when the first primary scanning of the optical beam has completed, the entire material will resume a low transmissivity state before the next scanning of the optical beam is started. Therefore, it becomes possible to prevent the slit-shaped area of the material where the transmissivity is increased from being progressively extended through repeated primary scannings. Thus, the flare reducing effect is also ensured in the primary scan direction.

According to a second aspect of the present invention, there is provided an image reader wherein a recording material on which an image is recorded is scanned using a reading optical beam, and a recorded image is read by photoelectrically detecting emitted light, transmitted light or reflected light from the recording material using a photodetector, the improvement being characterized by comprising material having nonlinear characteristics in which transmissivity is increased upon exposure to a reading optical beam, and a property for changing transmissivity in accordance with an optical intensity becomes considerably low in an optical low intensity region, the material being positioned at the location where the material is exposed to the reading optical beam advancing towards the recording material.

In the second aspect, the material has a nonlinear characteristic that causes transmissivity to be increased upon exposure to the reading optical beam but causes the property for changing transmissivity in accordance with an optical intensity to be considerably reduced in a low optical intensity range. If the material is positioned at the location where the material is exposed to the reading optical beam advancing towards a recording material, the reading optical beam, having an intensity considerably higher than that of ordinary flare light appropriately, passes through the material, but the majority of weak flare light is absorbed by the material. In this way, the incidence of flare light on areas of the recording material other than the predetermined scanning point which results in emitted light, transmitted light or reflected light, is prevented. Accordingly, it becomes possible to assure high contrast of an image to be read.

According to a third aspect of the present invention, there is provided an image recorder wherein a recording optical beam is modulated on the basis of a recording optical beam, and an image carried by the image signal is recorded on a recording material by scanning the recording material using the optical beam, the improvement being characterized by comprising:

material having nonlinear characteristics in which the transmissivity of the material is increased upon exposure to the recording optical beam, and a property for changing transmissivity in accordance with an optical intensity becomes considerably low in an optical low intensity region, the material being positioned at the location where the material is exposed to the recording optical beam advancing towards the recording material.

In the above image recorder, the material has the nonlinear characteristic that causes the transmissivity of the material to be increased upon exposure to the reading optical beam but causes the property for changing transmissivity in accordance with an optical intensity to be considerably reduced in a low optical intensity range. If such material is positioned at the location where the material is exposed to the reading optical beam advancing towards a recording material, the reading optical beam having an intensity considerably higher than that of ordinary flare light appropriately passes through the material, but the majority of weak flare light is absorbed by the material. Even in this case, the incidence of flare light on areas of the recording material other than the predetermined scanning point is prevented. Accordingly, it becomes possible to assure high contrast of an image to be recorded.

BRIEF DESCRIPTION OF THE DRAWINGS

In the accompanying drawings,

FIG. 10 is a graph showing a property of a sheet used in the image reader in the fifth embodiment according to the present invention, i.e., a property for changing transmissivity in accordance with an optical intensity;

FIG. 11 is a side view showing a part of the image reader according to the fifth embodiment of the present invention.

DESCRIPTION OF THE PREFERRED EMBODIMENTS

By reference to the accompanying drawings, preferred embodiments of the present invention will be described in detail hereinbelow.

Figure 1:
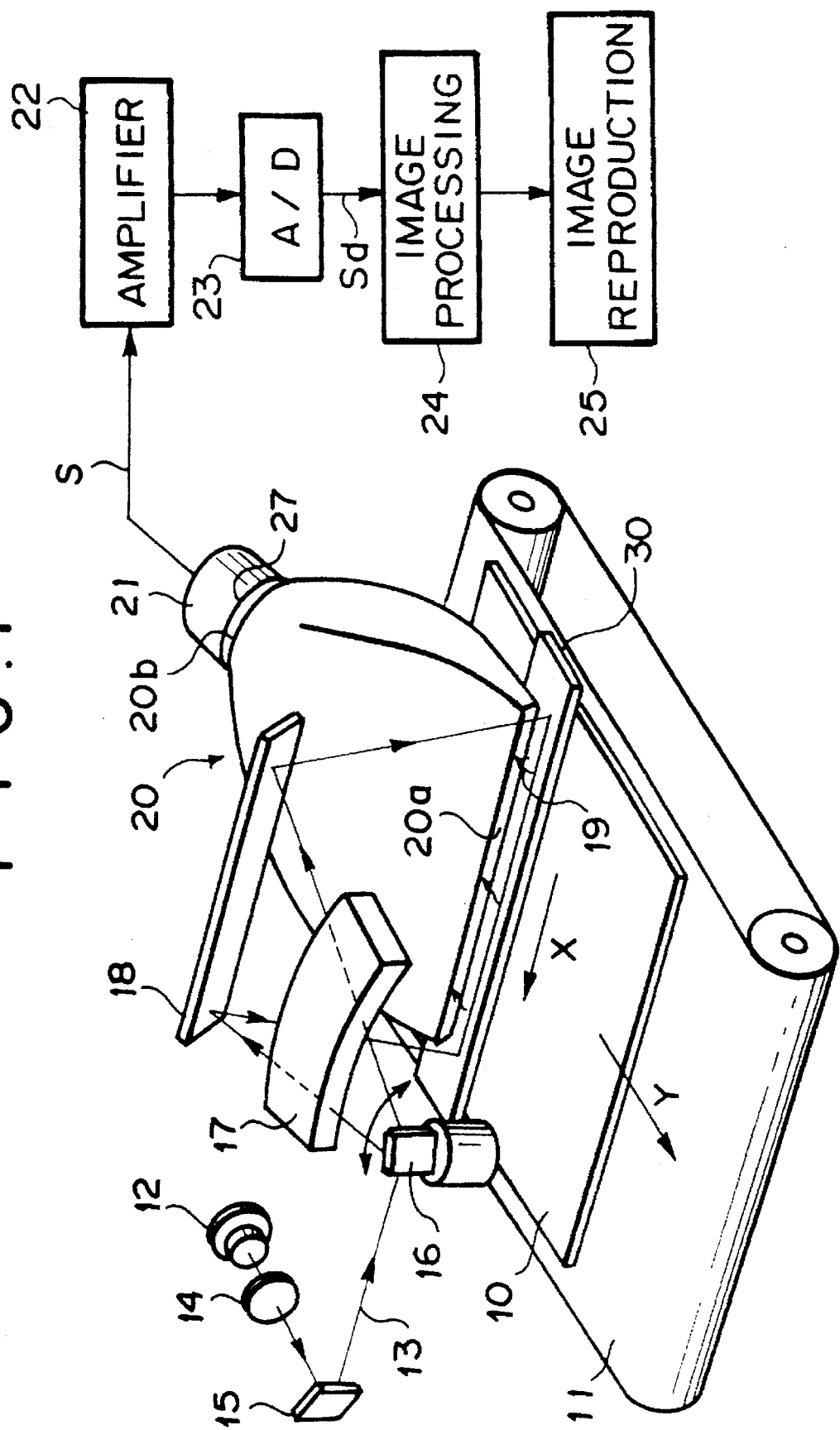
FIG. 1 is a perspective schematic view showing an image reader according to a first embodiment of the present invention.

First Embodiment:

FIG. 1 shows an image reader in a first embodiment according to the present invention. One example of this image reader is disclosed in U.S. Pat. No. 4,258,264 and Unexamined Japanese Patent Publication No. sho-56(1981)-11395, and the image reader reads radiographic image data recorded on a stimulable phosphor sheet.

For example, an object such as a human body is exposed to radiations such as x-rays, and the resulting transmitted radiographic image data of the object is accumulated and recorded on a stimulable phosphor 10. The stimulable phosphor 10 is transferred in the direction of an arrow Y, for the purpose of secondary scanning, by means of a sheet transfer means 11 such as an endless belt. A laser beam 13 emitted as a pump beam (reading light) from a semiconductor laser 12 is collimated by a collimator lens 14 and is reflected from a mirror 15. The thus reflected laser beam 13 is further reflected and deflected by an optical deflector 16, for example, a galvanometer or the like. The deflected laser beam is converged by means of a scanning lens 17 consisting of an ordinary f θ lens, and the converged laser beam is reflected from a mirror 18. Thus, the laser beam is scanned over the stimulable phosphor 10 in a primary scanning direction X which is essentially orthogonal to the secondary scanning direction Y.

A sheet 30 which extends along a primary scanning line on the stimulable phosphor 10 is provided in close proximity to the surface of the stimulable phosphor 10. The laser beam 13 enters the stimulable phosphor 10 after passing through the sheet 30. The action of this sheet 30 will be described in detail later.

Photostimulated light 19 having an amount of light corresponding to the radiographic image data accumulated and recorded on the sheet 10 is emanated from the area of the sheet 10 exposed to the laser beam 13. The photostimulated light 19 is collected by a light collecting guide 20, and is photoelectrically detected by a photomultiplier 21 which serves as an optical detector.

The light collecting guide 20 is fabricated by molding material having a light guiding property, such as an acrylic plate, and is arranged in such a way that a linear light entrance endface 20a extends in the direction of the primary scanning line on the stimulable phosphor 10. An annular light emission endface 20b is coupled with a light receiving surface of the photomultiplier 21. The photostimulated light 19 that enters the light collecting guide 20 from the light entrance endface 20a advances inside the light collecting guide 20 while being subjected to repeated total reflections, and the photostimulated light 19 is emitted from the light emission endface 20b. The thus emitted photostimulated light 19 is received by the photomultiplier 21. The quantity of the photostimulated light 19 that contains the radiographic image data is detected by the photomultiplier 21. A filter 27 is interposed between the photomultiplier 21 and the light collecting guide 20 for selectively permitting the transmission of light in the range of the photostimulated light 19.

An analogue output signal S from the photomultiplier 21 is amplified by a logarithmic amplifier 22, and the amplified signal is then digitized by means of an analogue-to-digital converter 23 using a predetermined scale factor. A thus obtained image signal Sd is subjected to image processing such as gradation processing and frequency processing by means of an image processing unit 24, and the image signal is then inputted into an image reproduction unit 25, for example, a CRT display unit or an optical scan recording unit or the like. A radiographic image accumulated and recorded on the cumulative fluorescence sheet 10 is reproduced by the image reproduction unit 25.

The action of the previously mentioned sheet 30 will be described. The semiconductor laser 12 employed in the first embodiment emits the laser beam 13 having a wavelength of 635 nm. Upon exposure to the laser beam 13 having a wavelength of 635 nm, the stimulable phosphor 10 emits the photostimulated light 19 chiefly at a wavelength of around 400 nm. A photochromic material 30a is produced by synthesizing a polymer which contains 4,4'-bipyridinium ions of tetraphenylborate as a part of main chains, and by replacing counter ions of the polymer with tetrakis-[3,5-bis (trifluoromethyl)phenyl]borate (TFPB−). A thin film of this photochromic material 30a is formed over a transparent supporting material 30b by a spin coating method, whereby the sheet 30 shown in FIG. 2 is obtained.

Figure 3:
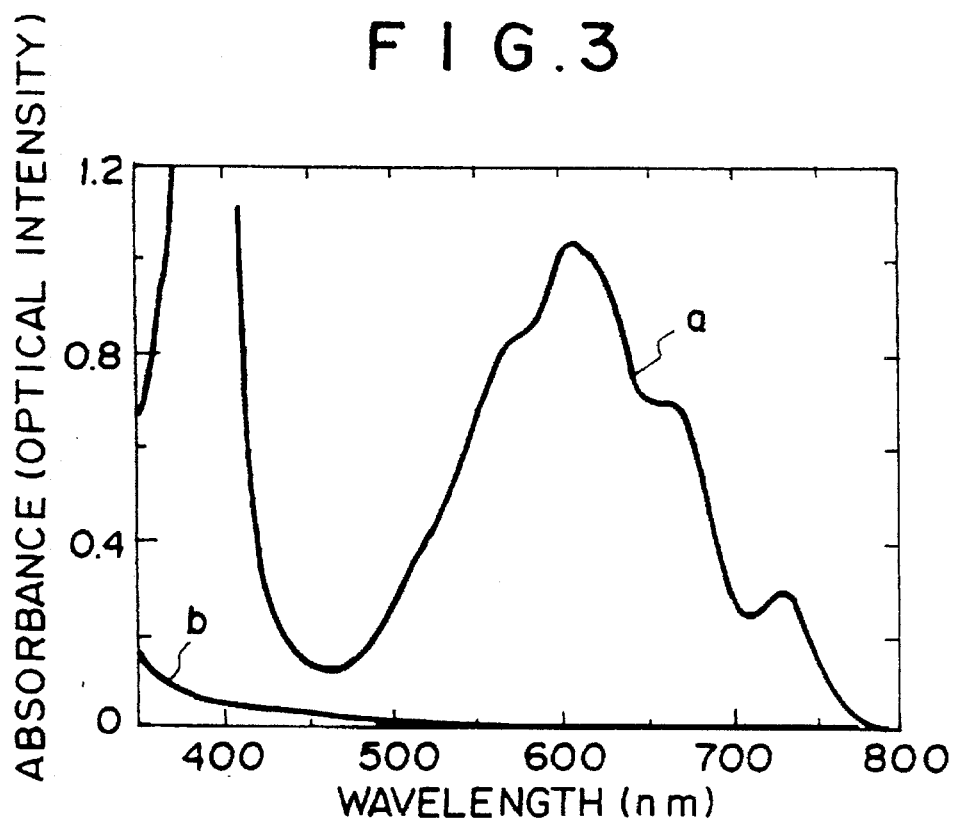
FIG. 3 is a graph showing absorption spectra of a sheet used in the image reader according to the first embodiment.

FIG. 3 shows absorption spectra of the photochromic material 30a. In the drawing, a curve "a" is an absorbance obtained when the photochromic material is exposed to light at a wavelength of around 400 nm, and a curve "b" is an absorbance obtained when the photochromic material is exposed to the laser beam 13 at a wavelength of 635 nm. Here, the absorbance is indicated by optical intensity.

If the sheet 30 that carries such a photochromic material 30a as previously mentioned is exposed to the laser beam 13 having a wavelength of 635 nm, the laser beam 13 will cause the absorbance of the photochromic material 30a to drop in the manner as shown by the curve "b", that is, it will cause the transmissivity of the photochromic material to be increased. Hence, the laser beam 13 appropriately passes through the photochromic material 30a and reaches a predetermined scanning point, so that the photostimulated light 19 is emitted from this scanning point. At this time, as shown in FIG. 2, the photostimulated light 19, chiefly at a wavelength of around 400 nm, is emanated around the area of the photochromic material 30a through which the laser beam 13 passes. This causes the absorbance of this area to be increased like the curve "a" shown in FIG. 3, namely, the transmissivity of that area is decreased. The absorbance of the area of the photochromic material 30a exposed to the laser beam 12 is not greater than 0.05 in optical intensity even when the laser beam 13 and the photostimulated light 19 are combined together. On the other hand, the absorbance of the vicinity of the area through which the laser beam 13 passes is around 2.0 in optical intensity.

Figure 2:
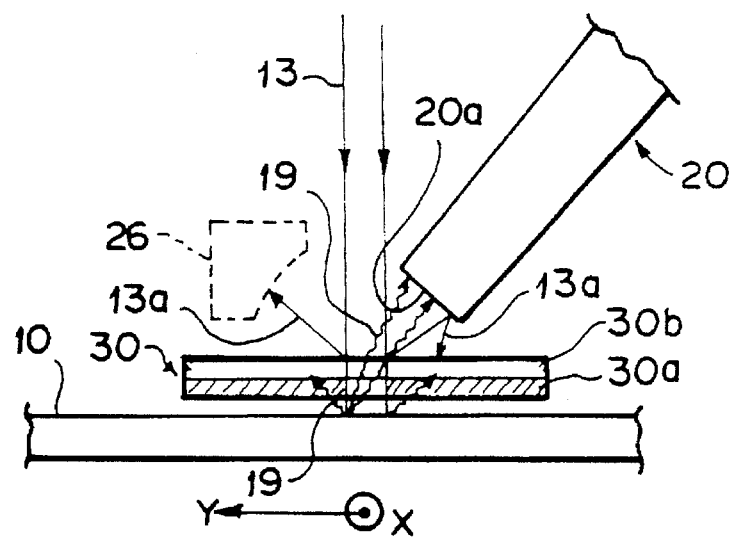
FIG. 2 is a side view showing a part of the image reader according to the first embodiment of the present invention.

As shown in FIG. 2, a part of the laser beam 13 may be reflected from the surface of the sheet 30 or reflected from an optical system provided in front of the sheet 30, and this may often cause weak flare light 13a. Such flare light 13a will be reflected from the light incidence endface 20a of the light collecting guide 20. If a collecting mirror 26 is disposed in order to improve a light collecting efficiency of the photostimulated light 19, the flare light 13a will also be reflected from the collecting mirror 26. Upon reflection from the light incidence endface 20a or the collecting mirror 26, the flare light 13a advances towards areas of the cumulated fluorescent sheet 10 other than the predetermined scanning point.

However, if the sheet 30 is provided, the weak flare light 13a advancing towards an area of the stimulable phosphor 10 other than the predetermined scanning point cannot appropriately pass through the sheet 30, and hence the occurrence of the photostimulated light 19, resulting from the arrival of the flare light 13a at the stimulable phosphor 10, is prevented. On the other hand, the photostimulated light 19 emitted from the predetermined scanning point passes through the spot-shaped area of the sheet 30 where the transmissivity is increased upon exposure to the laser beam 13, and it eventually enters the light collecting guide 20.

In other words, the laser beam 13 directly advancing towards the predetermined scanning point on the stimulable phosphor 10 solely arrives at the stimulable phosphor 10, and the photostimulated light 19 emitted from the sheet 10 as a result of this is detected by the photomultiplier 21. In this way, the influence of the flare light is eliminated. Here, the width of the sheet 30 (the size of the sheet 30 in the secondary scanning direction Y) is set sufficient to cover all of the area affected by the influence of the flare light 13a.

The spot-shaped area of the sheet 30 where the transmissivity is increased upon exposure to the laser beam 13 moves as the laser beam 13 scans. Accordingly, the scanning of the laser beam 13 and the detection of the photostimulated light 19 are carried out as if they are being carried out through a moving pinhole. Thus, the elimination of the influence of the flare light in both the primary and secondary scanning directions is ensured.

Figure 4:
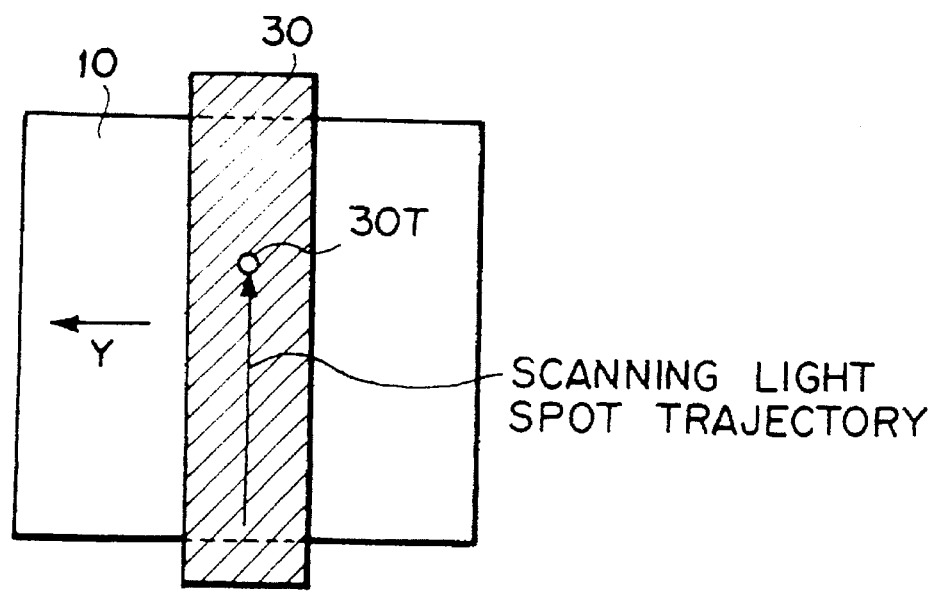
FIG. 4 is a schematic view showing the shape of an area of the sheet where transmissivity is high.
Figure 5:
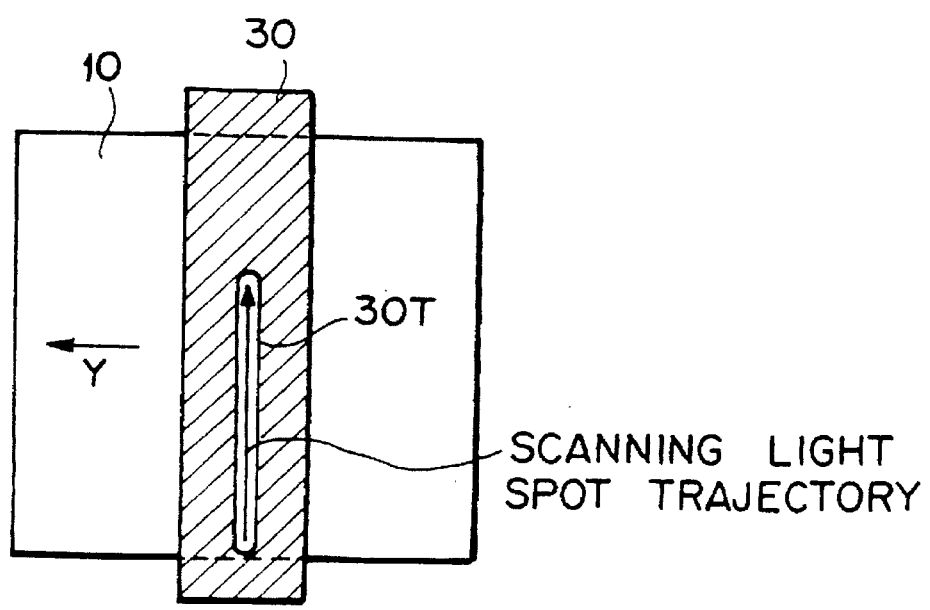
FIG. 5 is a schematic view showing the shape of an area of another sheet used for the present invention where transmissivity is high.

Upon exposure to either a sufficient amount of laser beam 13 or photostimulated light 19, the polymeric photochromic material 30a is switched between a high transmissivity state and a low transmissivity state at high speed (for example, a necessary time of 1 μs or thereabouts). For this reason, the area of the sheet 30 that the laser beam 13 has passed through momentarily resumes low transmissivity state. Therefore, a spot-shaped area 30 T with a high transmissivity is formed in the sheet 30 in the manner as mentioned above (see FIG. 4).

If the photochromic material 30a used in the sheet 30 resumes a low transmissivity state from a high transmissivity state at relatively low speed, the area 30 T of the sheet 30 where the transmissivity is high assumes a slit-like shape. In such a case, the influence of the flare light 13a in the secondary scanning direction Y can be eliminated. As a matter of course, it is more desirable to eliminate the influence of the flare light 13a in the primary scanning direction X.

Figure 6:
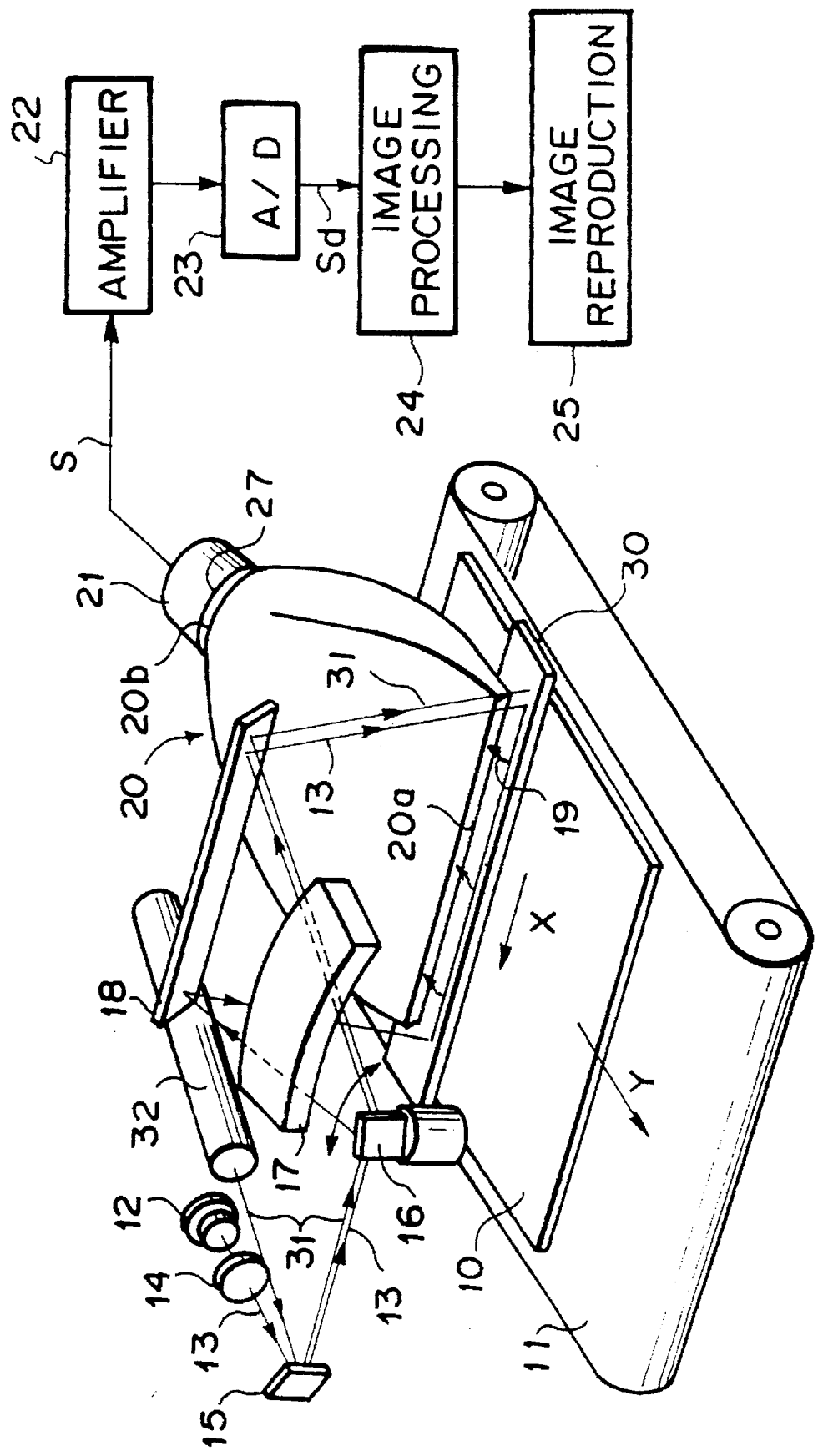
FIG. 6 is a perspective view showing an image reader according to a second embodiment of the present invention.

Second Embodiment:

FIG. 6 shows an image reader according to a second embodiment of the present invention, in which measures are taken to eliminate the influence of the flare light 13a in the primary scanning direction X. The image reader according to the second embodiment will now be explained. Here, in the drawing, the same reference numerals are provided to designate corresponding features shown in FIG. 1, and hence the explanation thereof will be omitted here for brevity. The same shall apply to the following descriptions.

In this embodiment, a HeCd laser 32 is provided which emits a laser beam 31 at a wavelength of 325 nm, and the laser beam 31 enters the optical deflector 16 together with the laser beam 13. The laser beam 31 is reflected and deflected by the optical deflector 16 along with the laser beam 13. In this way, the thus deflected laser beams 31 and 13 scan over the stimulable phosphor 10 in a direction of an arrow X. The angles of incidence of the laser beams 31 and 13 to the optical deflector are slightly different from each other. Hence, the laser beam 31 scans over the stimulable phosphor 10 so as to trace the laser beam 13. The laser beams 31 and 13 scan in the direction opposite to the direction of the arrow X during a flyback period, and the reading of an image is not carried out during that period.

In the above construction, the area of the sheet 30 whose transmissivity becomes high upon exposure to the laser beam 13 is immediately exposed to the high-intensity laser beam 31 at a wavelength of 325 nm and resumes a low transmissivity state at high speed after the exposure of the stimulable phosphor 10 to the laser beam 13 and the detection of the photostimulated light 19 have been performed. Even in this case, the area of the sheet 30 where the transmissivity becomes high upon exposure to the laser beam 13 assumes a substantially spot-like shape, and therefore the elimination of the influence of the flare light 13a in the primary scanning direction is ensured.

In lieu of the HeCd laser 32, it is also possible to use an eximer laser that emits, for example, a laser beam having a wavelength of 351 nm, a light source unit comprising a combination of a semiconductor laser which emits a laser beam at a wavelength of 670 nm and a nonlinear optical crystal which converts the wavelength of the laser beam to a second harmonic wave at a wavelength of 335 nm, as well as a light source unit comprising a combination of a xenon mercury lamp, a heat sink filter and a collimator lens for collimating light emitted from the xenon mercury lamp.

Even in this case, it is desirable for the filter 27, interposed between the photomultiplier 21 and the light collecting guide 20, to have a spectral characteristic that enables the photostimulated light 19 to appropriately pass and suitably absorbs the laser beam 31.

Figure 7:
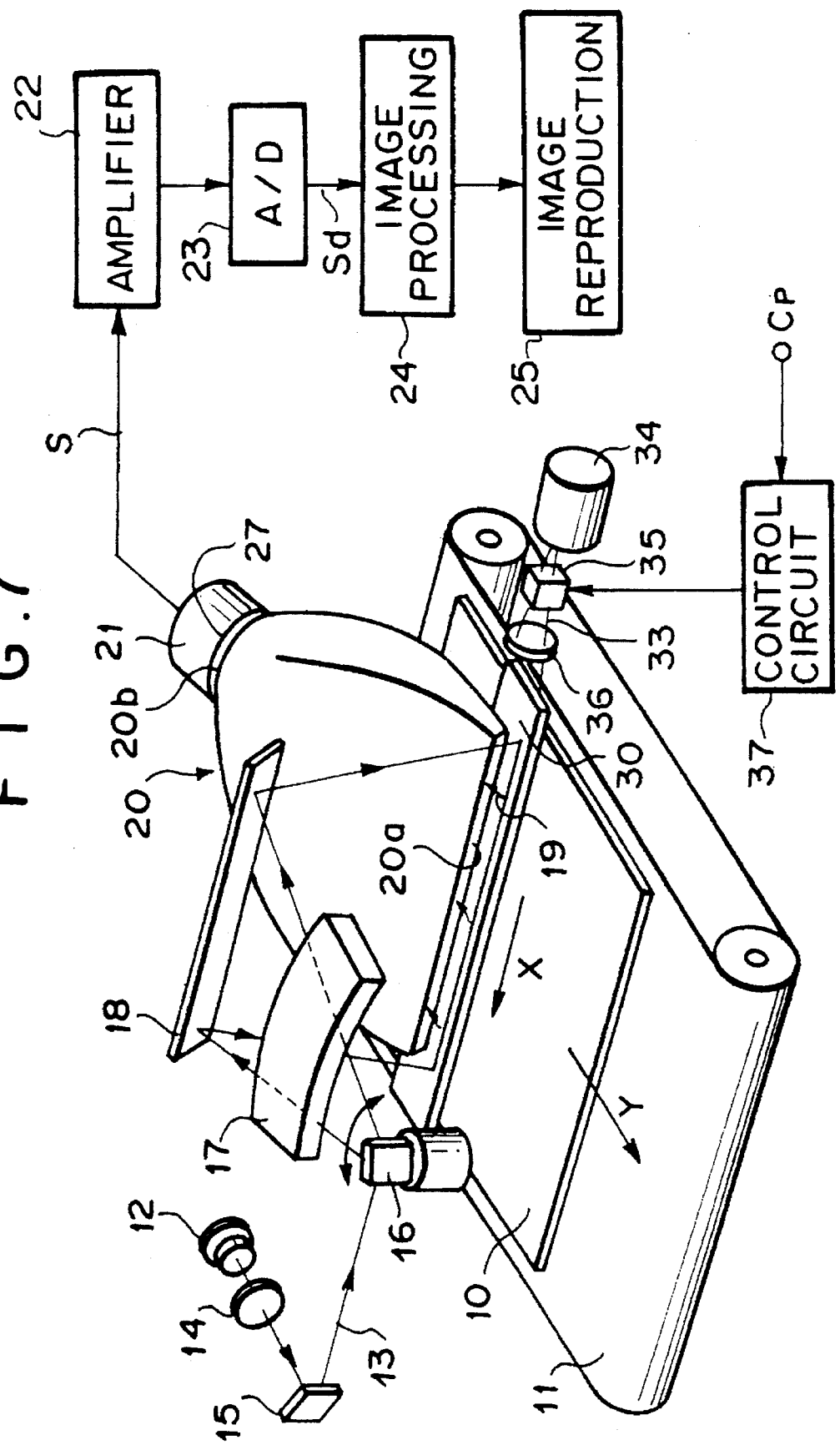
FIG. 7 is a perspective view showing an image reader according to a third embodiment of the present invention.

Third Embodiment:

Referring to FIG. 7, an image reader according to a third embodiment of the present invention will now be explained. In this image reader, a light source 34 which emits colored light 33 having a wavelength of 400 nm is positioned so as to face the side endface of the sheet 30. The colored light 33 passes through an AOM (acoustic-optical modulator) 35. Thereafter, the light 33 is collected by a collimator lens 36 and is irradiated to the side endface of the sheet 30.

The AOM 35 is controlled by a control circuit 37 which receives a pixel clock Cp and is usually controlled so as to interrupt the colored light 33. However, the AOM 35 is controlled so as to let the colored light 33 pass during the flyback period of the laser beam 13. Then, the colored light 33 enters the sheet 30 from its side endface and advances to the inside thereof while being subjected to the repeated total reflections. As a result of this, the photochromic material thin film 30a provided on the sheet 30 is exposed to the colored light 33.

In this way, the photochromic material 30a is exposed to the high-intensity colored light 33 in the flyback period during which the effective primary scanning of the laser beam 13 is suspended. Even if the area of the sheet 30 where the high transmissivity is high assumes a slit-like shape at the time one primary scan of the laser beam 13 is completed, the entire sheet 30 resumes a low transmissivity state (a colored state) by the initiation of next primary scanning. Thus, the progressive extension of the area of the sheet 30 having a high transmissivity as a result of the repetition of primary scanning many times is prevented, and hence a flare reducing effect is ensured even in the primary scanning direction.

Figure 8:
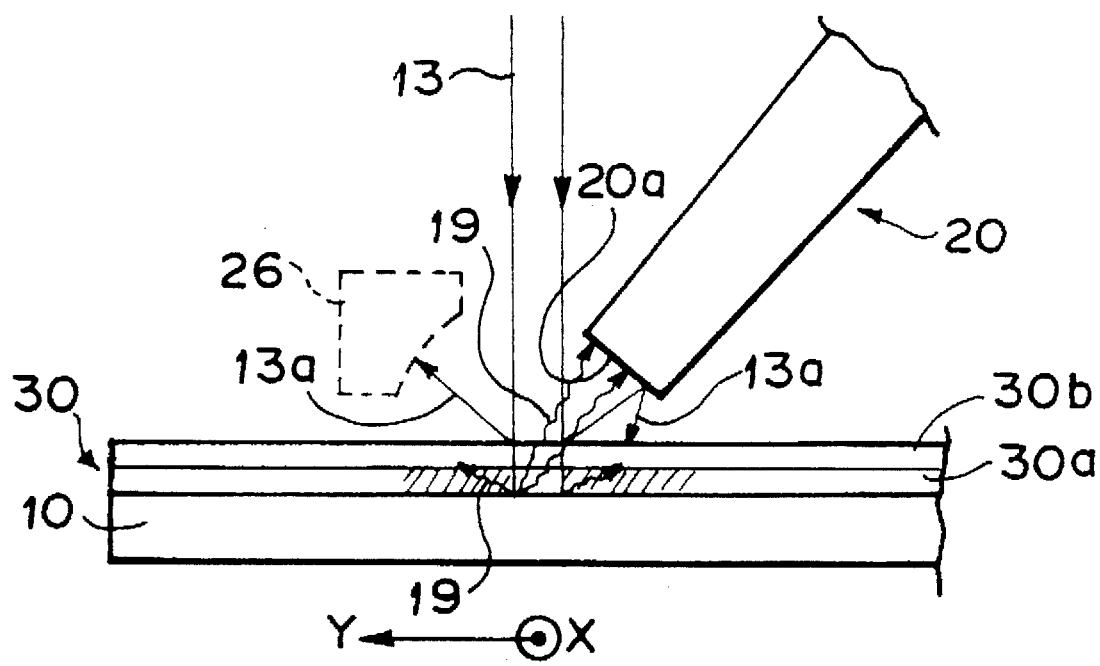
FIG. 8 is a side elevation view showing a part of an image reader according to a fourth embodiment of the present invention.

Fourth Embodiment;

In the image readers according to the first to third embodiments, the sheet 30 is fixed to the image reader, and the stimulable phosphor 10, acting as a recording material, moves relative to the sheet 30. However, like an image reader according to a fourth embodiment shown in FIG. 8, the sheet 30 may be fixed to the surface of the stimulable phosphor 10 in an integrated fashion, and a radiographic image can be read while the sheet 30 is moved together with the stimulable phosphor 10.

In such a case, it may be possible to integrate the stimulable phosphor 10 delivered from the image reader with the sheet 30 in the image reader, and to remove the sheet 30 from the stimulable phosphor 10 after the completion of the reading of an image. Thereafter, the removed sheet 30 may be reused for the following stimulable phosphor 10. Alternatively, the sheet 30 is completely fixed to the surface of the stimulable phosphor 10, and the stimulable phosphor 10 may be handled as it is for recording (acquiring) a radiographic image.

In addition to those set forth above, materials such as a spiropiran (SP1822) or nitrospirobenzopyrene or the like may be used as the photochromic material 30a used for constituting the sheet 30, that is, a photochromic material that increases transmissivity upon exposure to a reading optical beam but decreases it upon exposure to light emitted from a recoding material.

Figure 9:
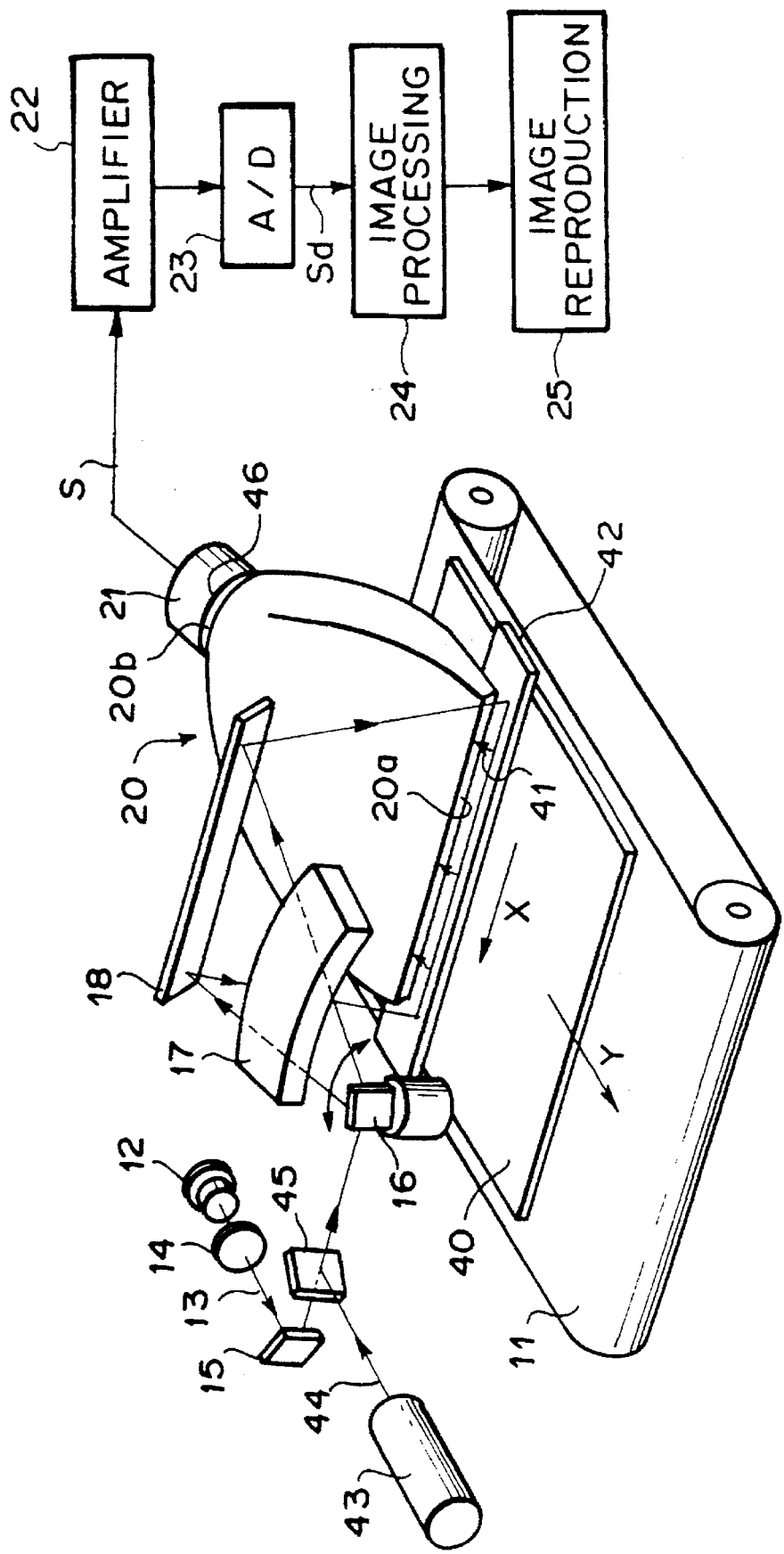
FIG. 9 is a perspective view showing an image reader according to a fifth embodiment of the present invention.

Fifth Embodiment: Referring to FIG. 9, an image reader according to a fifth embodiment of the present invention will be explained. The image reader according to this embodiment is to read a monochromatic image from a reflective original. Compared with the image reader shown in FIG. 1, the image reader of this embodiment is different from that of the first embodiment in several points. That is, the image reader of this embodiment uses a sheet 42 whose characteristic is different from that of the sheet 30, and a laser beam 44 emitted from a laser light source 43 which is different from the semiconductor laser 12 is combined with the laser beam 13, by means of a dichroic mirror 45. In addition, the image reader of this embodiment uses a filter 46 whose characteristic is different from that of the filter 27.

When the laser beam 13 having a wavelength of 635 nm scans over a reflection original 40 in both primary and secondary scanning directions, reflected light 41 corresponding to the density of a recorded image is emitted from areas of the reflection original 40 exposed to the laser beam 13. In the same manner as in the image reader shown in FIG. 1, the reflected light 41 is photoelectrically detected by the photomultiplier 21, and an image represented by the output signal S of the photomultiplier 21, i.e., an image recorded on the reflection original 40 is reproduced by the image reproducing unit 25. The filter 46 selectively permits only the reflected light 41 having a wavelength of 635 nm to pass.

The sheet 42 used in the image reader of this embodiment is made of a photochromic material, for example, boric-acid-lanthanum-based glass. FIG. 10 schematically shows the relationship between an optical intensity of the laser beam 44 and a transmissivity of the laser beam 13. In other words, the property of changing transmissivity in accordance with an optical intensity is not linear but nonlinear, because the transmissivity to the laser beam 13 in a low optical intensity region of the laser beam 44 becomes considerably low. A laser light source 43 is similar to the semiconductor laser 12 used in the first to third embodiments, and emits a laser beam 44 at 635 nm in a pulsed manner.

As designated by a point P1 shown in FIG. 10, the optical intensity of the laser beam 44 emitted towards the reflection original 40 is set to such a value that it causes the transmissivity of the sheet 42 to the laser beam 13 to be sufficiently increased (that is, such a value that it causes the absorbance of the sheet to be sufficiently reduced). In such a case, the laser beam 13 appropriately passes through the sheet 42 and arrives at the reflective original 40. The light 41 reflected from the reflective original 40 also appropriately passes through the areas of the sheet 42 where the transmissivity is partially increased upon exposure to the laser beam 44, and the reflected light 41 also enters the light collecting guide 20.

Flare phenomena may occur in the optical system through which the laser beam 13 has passed before arriving at the sheet 42. In such a case, the flare light 13a becomes stray light as shown in FIG. 11, and the stray light advances towards the reflective original 40 around the laser beam 13 that travels along a normal optical path. Usually, the flare light 13a is very weak, and the optical intensity of this light has a value designated by a point P2 shown in FIG. 10, that is, a value at which the transmissivity of the sheet 42 cannot be sufficiently increased.

Therefore, it is impossible for the weak flare light 13a to pass through the sheet 42 in the vicinity of the laser beam 13 that travels along the normal optical path. As a result of this, the majority of the flare light 13a is absorbed by the sheet 42. In this way, the flare light 13a is prevented from entering areas other than the predetermined scanning point on the reflective original 40, which in turn prevents reflected light 41 from arising from these areas. Accordingly, it is possible to ensure high contrast of a read image.

The image reader of this embodiment is to read an image by detection of the reflected light 41 from the reflective original 40. Similarly, the construction for eliminating the influence of the flare light 13a using the above mentioned sheet 42 is also applicable to the following two types of image reader, namely, an image reader (for example, the image reader shown in FIG. 1) designed to detect emitted light that results from the scanning of a recording material using a reading optical beam, and an image reader designed to detect light transmitted through a recording material when the recording material is scanned using a reading optical beam.

In addition to boric-acid-lanthanum-based glass, spiropyranes replaced by appropriate radicals may be used as the photochromic material used for fabricating the sheet 42.

Figure 12:
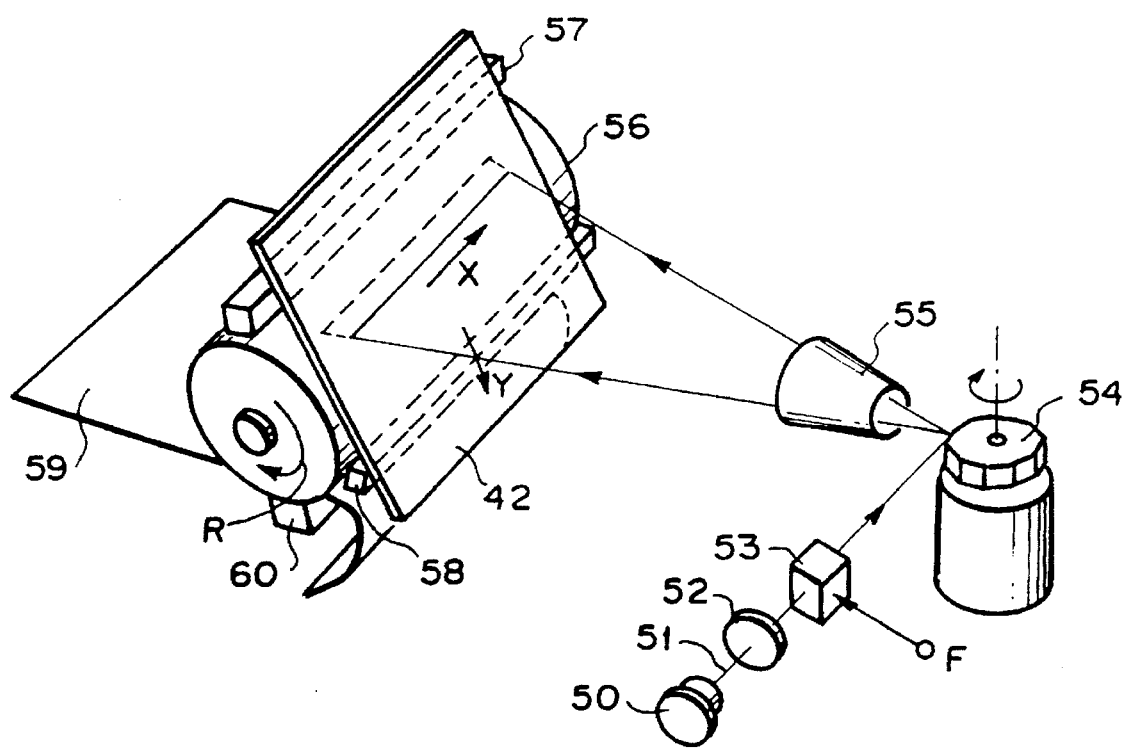
FIG. 12 is a perspective view showing an image recorder according to a sixth embodiment of the present invention.

Sixth Embodiment:

Referring to FIG. 12, an image recorder according to a sixth embodiment of the present invention will be described. An apparatus according to this embodiment is an image recorder that records an image using electrophotography. As shown in the drawing, a laser beam 51 having a wavelength of 635 nm emitted from a semiconductor laser 50 is collimated by a collimator lens 52, and the thus collimated laser beam 51 passes through an AOM (acoustic-optical modulator) 53. The AOM 53 modulates the laser beam 51 on the basis of an image signal F, and then the modulated laser beam enters an optical deflector 54 such as a polygon mirror or the like. The laser beam 51 is then deflected upon reflection from the optical deflector 54, and the deflected laser beam 51 is collected by a scanning lens 55. The collected laser beam passes through a sheet 42, and the primary scanning of the laser beam over a photosensitive drum 56, consisting of an electrophotographic photosensitive substance, is carried out in the direction of an arrow X.

The photosensitive drum 56 has previously been evenly charged evenly by an electrostatic charger 57 before being subjected to the scanning of the laser beam 51. The photosensitive drum 56 is rotated at a constant speed in a direction of an arrow R. AS a result of the exposure of the evenly charged portion of the photosensitive drum 56 to the laser beam 51, an image that the laser beam 51 carries, that is, an image represented by the image signal F, is recorded as an electrostatic latent image on that charged portion. The electrostatic latent image is then developed into a toner image by a processing machine 58. The toner image is transferred to print paper 59, supplied in close contact with the photosensitive drum, using a transfer instrument 60. In this way, the image represented by the image signal F is recorded as a toner image on the print paper 59.

In this image recorder, as with the sheet 42 used in the image reader according to the fifth embodiment shown in FIG. 9, the sheet 42 disposed in front of the photosensitive drum 56 possesses a nonlinear property for changing transmissivity in accordance with an optical intensity which becomes considerably low in a low optical intensity range of the laser beam 51. In the same manner as in the image reader according to the fifth embodiment, even in this case, if weak flare light is emitted from the laser beam 51, the flare light cannot pass through the sheet 42 in the vicinity of the laser beam 51 that travels along a normal optical path. Eventually, the majority of the flare light is absorbed by the sheet 42. Therefore, the flare light is prevented from entering areas other than the predetermined scanning point on the photosensitive drum 56, and hence it is possible to ensure high contrast of a recorded image.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. An image recorder comprising:

a first light source for emitting an optical beam for reading purposes that scans a recording material on which an image is recorded;

a photodetector for reading an image by photoelectrically detecting light that has a wavelength differing from that of the optical beam and is emitted from the recording material as a result of the scanning of the recording material; and a flare suppression material which increases transmissivity upon exposure to the optical beam but decreases the transmissivity upon exposure to the emitted light, the flare suppression material being positioned so as to receive the recording optical beam advancing towards the recording material, wherein the photodetector is positioned so as to receive the emitted light through the flare suppression material.

2. The image recorder as defined in claim 1, further comprising:

a second light source for emitting a second optical beam at a wavelength range which causes the transmissivity of the flare suppression material to be decreased; and a scanning means for causing the second optical beam to scan over the flare suppression material in such a way as to trace the reading optical beam.

3. The image recorder as defined in claim 1, further comprising:

a second light source for emitting light at a wavelength which causes the transmissivity of the flare suppression material to be reduced: and a means for causing the entire flare suppression material to be exposed to the light emitted from the second light source in a period during which an effective primary scanning of the reading optical beam is suspended.

4. The image recorder as defined in claim 1, wherein the recording material and the flare suppression material are integrated together.

5. The image recorder as defined in claim 2, wherein the recording material and the flare suppression material are integrated together.

6. The image recorder as defined in claim 3, wherein the recording material and the flare suppression material are integrated together.

7. The image recorder as defined in claim 1, wherein the flare suppression material is a photochromic material selected from the group consisting of a spiropiran and nitrospirobenzopyrene.

8. The image recorder as defined in claim 2, wherein the flare suppression material is a photochromic material selected from the group consisting of a spiropiran and nitrospirobenzopyrene.

9. The image recorder as defined in claim 3, wherein the flare suppression material is a photochromic material selected from the group consisting of a spiropiran and nitrospirobenzopyrene.

10. An image reader comprising:

a light source for emitting an optical beam for reading purposes that scans a recording material on which an image is recorded;

a photodetector for reading an image by photoelectrically detecting emitted light, transmitted light or reflected light from the recording material as a result of the scanning of the recording material; and a flare suppression material having a nonlinear transmissivity characteristic, the transmissivity of the flare suppression material increasing upon exposure to the reading optical beam, but decreasing to a low degree of transmissivity in accordance with an optical intensity in a low optical intensity region, the flare suppression material being positioned so as to receive the reading optical beam advancing towards the recording material.

11. The image reader as defined in claim 10, wherein the flare suppression material is a photochromic material selected from boric-acid-lanthanum-based glasses, spiropyranes, derivatives of boric-acid-lanthanum-based glasses, and derivatives of spiropyranes.

12. An image recorder comprising:
- a means for modulating an optical beam for recording purposes on the basis of an image signal;
- a means for recording an image, which the image signal contains, on the recording material by scanning the recording material using the reading optical beam; and
- a flare suppression material having a nonlinear characteristic that increases transmissivity upon exposure to the recording optical beam but decreases a property of changing transmissivity in accordance with an optical intensity to a considerably low degree in a low optical intensity region, the flare suppression material being positioned so as to receive the recording optical beam advancing towards the recording material.

13. The image reader as defined in claim 12, wherein the flare suppression material is a photochromic material selected from boric-acid-lanthanum-based glasses, spiropyranes, derivatives of boric-acid-lanthanum-based glasses, and derivatives of spiropyranes.

* * * * *